United States Patent [19]

Gallucci et al.

[11] Patent Number: 4,749,754

[45] Date of Patent: Jun. 7, 1988

[54] IMPACT MODIFIED POLYAMIDE/POLYCARBONATE

[75] Inventors: Robert R. Gallucci, Mt. Vernon, Ind.; Louis M. Maresca, Pittsfield, Mass.

[73] Assignee: General Electric Company, Mt. Vernon, Ind.

[21] Appl. No.: 77,920

[22] Filed: Jul. 27, 1987

[51] Int. Cl.$^4$ ............................................. C08L 77/00
[52] U.S. Cl. ..................................... 525/432; 525/433
[58] Field of Search ........................ 525/432, 433, 467

[56] References Cited

U.S. PATENT DOCUMENTS 3,632,666  1/1972  Okazaki et al. ................... 525/432

FOREIGN PATENT DOCUMENTS 0068368  4/1984  Japan .
1141754  6/1986  Japan .

Primary Examiner—Theodore E. Pertilla
Attorney, Agent, or Firm—Joseph T. Eisele; Martin B. Barancik

[57] ABSTRACT

Thermoplastic molding composition comprising amorphous polyamide and polycarbonate resin blends exhibit improved impact resistance by addition of a polyamide-polyether block copolymer.

13 Claims, No Drawings

IMPACT MODIFIED POLYAMIDE/POLYCARBONATE

BACKGROUND OF THE INVENTION

1. Field of the Invention

The invention relates to thermoplastic molding compositions and more particularly relates to compositions of blended aromatic polycarbonate resins and polyamide resins.

2. Brief Description of the Prior Art

Blends of polycarbonate resin and polyamide resin, such as amorphous polyamide, have been found to possess a unique combination of properties which include, for example, high resistance to permeation by gases such as oxygen and carbon dioxide, low water absorption, high creep resistance, and good organic solvent resistance. However, as with other thermoplastic resin blends, it is often desirable to enhance the impact resistance for particular applications. For example, impact modification of amorphous polyamide/polycarbonate blends may be desirable when used to mold liquid containers or exterior automotive parts. It has been suggested to enhance the impact resistance of polyamide/polycarbonate blends through the use of the so-called "super-tough nylons". However, with super-tough nylons, the impact modifier is grafted onto the polyamide, requiring a separare processing step. It is desirable to obtain a compatible impact modifier system which is highly effective and can be introduced to the polyamide/polycarbonate blend without graft processing.

Numerous methods and materials are available for impact modifying each of the polyamides and polycarbonates when separate and unblended. For example; core-shell graft copolymers have been used to impact modify polycarbonates, polyesters and blends thereof, as disclosed in U.S. Pat. Nos. 4,264,487, 4,697,075 and 4,542,179, and ethylene-propylene copolymers have been used to impact modify amorphous polyamides in U.S. Pat. No. 4,536,541. These disclosures are of little assistance in achieving the objects of the present invention since the effectiveness of impact modifiers is not predictable. This is particularly true for binary blends, such as this invention, where each constituent differs from the other in structure, molecular weight, functional groups, polarity, solubility, etc. An impact modifier may be insoluble or unstable in one of the resins causing it to be ineffective or it may cause delamination of the blend where two phases are present. It is desirable to obtain highly effective impact modifiers for polyamide/polycarbonate blends which do not introduce significant deleterious side effects.

SUMMARY OF THE INVENTION

The invention comprises a thermoplastic molding composition, which comprises;
an aromatic polycarbonate resin;
an amorphous polyamide resin; and
an impact-modifying proportion of a polyamide-polyether block copolymer resin.

The compositions of the invention are useful to mold impact-resistant structural articles such as exterior parts of automobiles. The invention also comprises the articles so molded.

DETAILED DESCRIPTION OF THE PREFERRED EMBODIMENTS OF THE INVENTION

The aromatic polycarbonate resins suitable for use herein may be prepared by reacting a dihydric phenol with a carbonate precursor, such as phosgene, a haloformate or a carbonate ester. Generally speaking, such carbonate polymers may be typified as possessing recurring structural units of the formula:

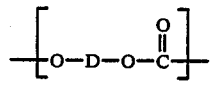

wherein D is a divalent aromatic radical of the dihydric phenol employed in the polymerization reaction. Preferably, the carbonate polymers used to provide the resinous compositions of the invention have an intrinsic viscosity (as measured in methylene chloride at 25° C.) ranging from about 0.30 to about 1.40 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis(4-hydroxyphenyl) propane and a carbonate precursor.

These aromatic polycarbonates may be manufactured by known processes, such as by the methods set forth in U.S. Pat. Nos. 4,018,750 and 4,123,436 where a dihydric phenol is reacted with a carbonate precursor; or by transesterification processes such as are disclosed in U.S. Pat. No. 3,154,008, as well as other processes known to those skilled in the art.

Included within the term "polycarbonates", for the purposes of this invention are the poly(ester-carbonate) resins. These resins may generally be described as polymers comprising recurring carbonate groups,

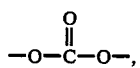

carboxylate groups,

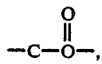

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) polymers, in general, are prepared by reacting an aromatic difunctional carboxylic acid or ester forming derivative, a dihydric phenol and a carbonate precursor.

The preparation of poly(ester-carbonates) which may be employed in the compositions of the present invention is described in U.S. Pat. Nos. 3,030,331; 3,169,121; 3,207,814; 4,194,038 and 4,156,069 incorporated herein by reference.

The poly(ester-carbonates) which are preferred in the practice of the present invention include the aromatic poly(ester-carbonates) derived from dihydric phenols, aromatic dicarboxylic acids or their reactive ester forming derivatives such as the aromatic diacid halides, and phosgene. A particularly useful class of aromatic poly(ester-carbonates) is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the poly(ester-carbonate) is generally from about 25 to 90 mole percent and preferably about 35 to 80 mole percent. The molar range of terephthalate units, with the remainder of the copolymer ester units preferably comprising isophthalate units, is generally from about 2 to about 90 percent, and preferably from about 5 to about 50 percent.

Typical dihydric phenols useful in formulating the polycarbonate resins, as described above, may be represented by the general formula:

in which A is an aromatic group such as phenylene, biphenylene, naphthylene or anthrylene. E may be an alkylene or alkylidene group such as isopropylidene, butylene, butylidene, isobutylidene, amylene, isoamylene, amylidene, isoamylidene, and generally has from one to twelve carbon atoms, inclusive. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, or by a sulfur-containing linkage such as sulfide, sulfoxide and sulfone. In addition, E may be a cycloaliphatic group of five to twelve carbon atoms, inclusive (e.g. cyclopentyl, cyclohexyl), or a cycloalkylidene of five to twelve carbon atoms, inclusive, such as cyclohexylidene; a sulfur-containing linkage, such as sulfide, sulfoxide or sulfone; an ether linkage; a carbonyl group; a direct bond; or a tertiary nitrogen group. Other groups which E may represent will occur to those skilled in the art. R is hydrogen or a monovalent hydrocarbon group such as alkyl of one to eight carbon atoms, inclusive (methyl, ethyl, propyl); aryl (phenyl, naphthyl); aralkyl (benzyl, ethylphenyl); or cycloaliphatic of five to twelve carbon atoms, inclusive (cyclopentyl, cyclohexyl). Y may be an inorganic atom such as chlorine, bromine, fluorine; an organic group such as the nitro group; an organic group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one; and s is any whole number from and including zero to twenty.

In the typical dihydric phenol compound represented by Formula I above, when more than one Y substituent is present, they may be the same or different. The same is true for the R substituent. Where s is greater than one, E can be the same or different. Where E is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted with Y and a hydroxyl group.

Examples of dihydric phenol compounds that may be employed in the above polymers include:
2,2-bis-(4-hydroxyphenyl)propane (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)-methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxyphenyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexymethane;
1,2-bis-(4-hydroxyphenyl)-1,2-bis-(phenyl)propane;
2,2-bis-(4-hydroxyphenyl)-1-phenylpropane; and the like. Also included are dihydroxybenzenes typified by hydroquinone and resorcinol; dihydroxydiphenyls such as 4,4'-dihydroxydiphenyl; 2,2'dihydroxydiphenyl; 2,4'-dihydroxydiphenyl; dihydroxy-naphthalenes such as 2,6-dihydroxynaphthalene, etc.

Also useful are dihydric phenols wherein E is a sulfur-containing radical such as the dihydroxy aryl sulfones exemplified by: bis-(4-hydroxyphenyl)sulfone; 2,4'-dihydroxydiphenyl sulfone; bis-(3,5-dimethyl-4-hydroxyphenyl)sulfone; 5'-chloro-2,4'-dihydroxydiphenyl sulfone; 3-chloro-bis-(4-hydroxyphenyl) sulfone; and 4,4'dihydroxytriphenyldisulfone; etc. The preparation of these and other useful sulfones are described in U.S. Pat. No. 2,288,282. Hydroxy terminated polysulfones as well as substituted sulfones using halogen, nitrogen, alkyl radicals are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4,4'-dihydroxydiphenyl ether;
4,4'-dihydroxytriphenyl ether;
the 4,3'-, 4,2'-, 4,1'-, 2,2'-, 2,3'dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-dichlorodinaphthyl-2,2'-ether;
4,4'-dihydroxypentaphenyl ether;
4,4'-dihydroxy-2,6-dimethoxydiphenyl ether; and
4,4-dihydroxy-2,5-diethoxydiphenyl ether.

Mixtures of the dihydric phenols can also be employed, and where dihydric phenol is mentioned herein, mixtures of such materials are considered to be included. Other dihydric phenols which are suitable are disclosed in U.S. Pat. Nos. 2,999,835; 3,028,365; 3,334,154; 4,131,575.

The carbonate precursor used to produce the polycarbonate resins may be either a carbonyl halide, a carbonate ester, or a haloformate. The carbonyl halides which can be employed are carbonyl bromides. Typical of the carbonate esters are diphenyl carbonate, di(halophenyl)carbonates such as di(chlorophenyl)carbonate, di(bromophenyl)carbonate, di(trichlorophenyl)carbonate, di(tribromophenyl)carbonate, di(alkylphenyl)carbonate such as di(tolyl)carbonate, phenyltolyl carbonate, chloronaphthyl chlorophenyl carbonate, and the like. The haloformates suitable for use herein include bishaloformates of dihydric phenols such as bischloroformates of hydroquinone or glycols such as bis-haloformates of ethylene glycol, neopentyl glycol, and polyethylene glycol. While other carbonate precursors will occur to those skilled in the art, carbonyl chloride, also know as phosgene, is preferred.

The aromatic difunctional carboxylic acids suitable for producing poly(ester-carbonates) may be represented by the general formula:

$$HOOC-Z-COOH \qquad (II)$$

wherein Z represents an aromatic radical such as phenylene, naphthylene, biphenylene, substituted phenylene; two or more aromatic groups connected through non-aromatic linkages such as those defined by E in Formula I; or a divalent aliphatic-aromatic hydrocarbon radical such as an aralkyl or alkaryl radical. For purposes of the present invention, the aromatic dicarboxylic acids or their reactive derivatives such as, for example, the acid halides or diphenyl esters, are preferred. Thus, in the preferred aromatic difunctional carboxylic acids, as represented by Formula II, Z is an aromatic radical such as phenylene, biphenylene, naphthylene, substituted phenylene, etc. Some nonlimiting examples of suitable aromatic dicarboxylic acids which may be used in preparing the poly(ester-carbonate) of the instant invention include phthalic acid, isophthalic acid, terephthalic acid, homophthalic acid, o-, m-, and p-phenylenediacetic acid, and the polynuclear aromatic acids such as diphenyl dicarboxylic acids and isomeric naphthalene dicarboxylic acids. The aromatics may be substituted with Y groups in the same manner as the Formula I aromatics are substituted. Of course, these acids may be used individually or as mixtures of two or more different acids.

The polyamides employed in this invention are the amorphous polyamides. Included within the term "amorphous polyamides" as used herein and in the claims are those polyamide polymers having a heat of fusion of about 1 calorie per gram or less, as determined by differential scanning calorimetry (DSC). Such amorphous polyamide polymers may have a degree of crystallinity as high as 5% and for some polyamides, the degree of crystallinity may be even higher. Preferably, the amorphous polyamides will not have a crystallization transition or crystalline melting transition in temperature and therefor, no measurable degree of crystallinity.

High levels of crystallinity within a sample are obtained from molecular symmetry, hydrogen bonding and linearity within the polymers. Where the polyamide polymers exhibit these characteristics, it is difficult to obtain samples in the amorphous state. Portions of a polymer may exhibit these characteristics and provide "islands" of crystallinity. To obtain amorphous polyamides, it is within the skill of a person knowledgeable in the art to avoid symmetry and linearity when producing polymers. Symmetry in the polymer may be avoided by utilizing a variety of monomers in the reaction mixture. Branched-chain monomer segments may be used instead of those having linear segments and hydrogen bonding can be avoided to some degree by utilizing aromatic groups. It should be noted that chain stiffness will also contribute to crystallinity, rendering hydrogen bonding unnecessary for crystallinity where chain stiffness and symmetry are sufficiently high. Ring containing polyamides, especially aromatic ring containing polyamides such as polyterephthalamides, have high stiffness and symmetry and tend to crystallinity. Side chain substitutions on the polymer backbone, such as the use of a methyl group to disrupt regularity and hydrogen bonding, may be employed. Odd chain diamines, diacids and meta aromatic substitution, may prevent crystallization. Symmetry may also be disrupted through copolymerization by using more than one diamine, diacid or monoamino-monocarboxylic acid. In the case of copolymers, those monomers which normally are polymerized to produce crystalline homopolymers such as nylon 6; 6/6; 11; 12; 6/3;6/4;6/10 or 6/12, may be copolymerized to produce a random amorphous copolymer.

Examples of amorphous polyamides contemplated to be used in this invention include, but are not limited to, those having repeating units of a formula selected from the group consisting of

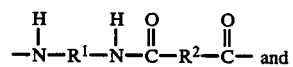 and

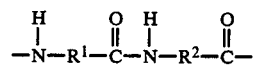

wherein $R^1$ and $R^2$ are different divalent organic radicals selected from the group consisting of $C_2$–$C_{15}$ alkylene radicals, $C_3$–$C_{18}$ cycloalkylene radicals and $C_6$–$C_{20}$ arylene radicals. Mixed alkylene-cycloalkylene radicals or alkylene-arylene or arylene-alkylene radicals of $C_4$–$C_{30}$ are also considered to be within the scope of the terms "cycloalkylene" and "arylene", respectively.

These amorphous polyamides may be prepared by polymerization of diamines having the formula:

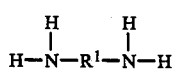

with dicarbonyl compounds such as dicarboxylic acids. esters or chlorides of the formula

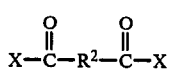

wherein X is chlorine, hydroxy, $C_1$–$C_3$ alkoxy or $C_6$–$C_{20}$ aryloxy and $R^1$ and $R^2$ are as defined above. Typically, equimolar portions of the diamine and dicarboxylic acid are utilized. Slight departures from the equimolar proportions can be tolerated. Examples of suitable diamines include trimethylene diamine, tetramethylene diamine, pentamethylene diamine, hexamethylene diamine, isomeric trimethylhexamethylene diamine, 2,2-bis (p-aminocyclohexyl) propane, bis(4-aminocyclohexyl)methane, bis(4-amino-3-methylcyclohexyl) methane, bis(4-aminophenyl) methane, metaphenylene diamine, paraphenylene diamine, meta-xylylene diamine, para-xylylene diamine and the like.

The dicarboxylic acids/esters include sebacic acid, suberic acid, glutaric acid, pimelic acid, adipic acid, octadecanedioic acid, terephthalic acid, isophthalic acid, and azelaic acid.

Preferred combinations of acid and amine include terephthalic acid with trimethyl-hexamethylene diamine; adipic acid plus azelaic acid with 2,2-bis-(p-aminocyclohexyl) propane; terephthalic acid with bis(4-aminocyclohexyl) methane; isophthalic acid with hexamethylene diamine and terephthalic acid and isophthalic acid with hexamethylene diamine and combinations thereof.

An alternative method for preparing the amorphous polyamides utilized in this invention is to polymerize two different monoamino-monocarbonyl compounds of each formula

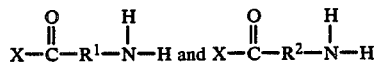

wherein X, $R^1$ and $R^2$ are as defined above. Laclam structures for these monoamino-monocarboxylic acids may also be utilized either alone or with the monoamino-monocarboxylic acids. The lactam structures are a ring structure formed by self-reaction of the amine and acid groups. Examples of these monoamino-monocarboxylic acids and their lactams include: aminocaproic acid, butyrolactam, pivalolactam, carpolactam, capryllactam, enantholactam, undecanolactam, dodecanolactam, 3-aminobenzilic acid and 4-aminobenzilic acid. Mixtures of the lactams with diamines and dicarboxylrc acids (and their derivatives) will also produce amorphous polyamides. Mixtures, random copolymers or block copolymers of two or more of the amorphous polyamides are within the scope of this invention also.

Particular examples of amorphous polyamides for use in the invention include, but are not limited to:

PACP-9/6, which is a 50:50 mole ratio copolymer of 2,2'bis (4-aminocyclohexyl) propane and a 60/40 weight percent mixture of azelaic acid and adipic acid. A more detailed description of the preparation of this polymer is found in U.S. Pat. No. 3,840,501, which is incorporated herein by reference;

Zytel ® 330 and Selar ® PA, which are amorphous polyamides derived from hexamethylene diamine and mixtures of terephthalic acid and isophthalic acid. These amorphous polyamides are available trom E. I. DuPont;

Grilamid ® TR 55, which is an amorphous polyamide derived from isophthalic acid/bis(4-amino-3-methyl-cyclohexyl) methane/lauryl lactam and is available from Emser Industries; and Trogamid ® T, which is derived from dimethyl terephthalate and a mixture of 2,2,4- and 2,4,4-trimethylhexamethylene diamine and is available from Dynamit Nobel.

It is preferred that the polyamides, as generally described above, have an amine end-group concentration sufficiently low that viscosity and molecular weight of the polycarbonate polymers and impact strength of the blends are stable. Preferably, viscosity and $M_w$ are not reduced by more than 20%. Generally, a low amine end-group concentration is defrned herein as less than about 20 g-meg/kg. Most preferably, the polyamide has less than about 10 g-meg/kg. Polyamides with such low amine end-group concentrations may be obtained by end-capping amine groups on base polyamides to control the concentration, or by polymerizing the polyamide under appropriate conditions to reduce the inherent amine end-group concentration of the base polymer.

The amine end-group concentratron of a polymerized base polyamide may be controlled by any of several amine end-capping reactions with an end-capping compound. One such end-capping reaction is an amidization reaction which combines the terminal amine group with, for example, an anhydride, $R^3(C=O)O(C=O)R^3$, to form an amide link; with an acid chloride, $R^3(C=O)CL$, to form an amide link; with a carboxylic acid $R^3(C=O)OH$, to from an amide link; with a carboxylic acid ester, $R^3(C=O)OR^3$, to form an amide link; with an amide, $R^3(C=O)NR^3R^3$, to from an amide link; with a carbonate, $R^3O(C=O)OR^3$, to from a urethane link; with a isocyanate, $R^3-N=C=O$, to form a urea link; and with a carbondiimide, $R^3-N=C=N-R^3$, to from a guanidine link, where $R^3$ is a saturated or unsaturated aliphatic or aromatic hydrocarbon. Obviously, each of the above reactions will replace the amine end-group with an $-R^3$ end-group attached to the polyamide through the indicated link.

Other reactions may be used to replace the end-group. An iminization reaction combines the amine end-group, for example with an aldehyde, $R^3(C=O)H$ or an acetal, $R^3C(OR^3)_2H$, to form an imine link, wherein $R^3$ is the same as above, and also includes hydrogen in this instance. An amination reaction combines the amine end-group, for instance, with an olefin, $R^4-CH=CH-R^4$, to form a substituted amine, wherein $R^4$ is $R^3$, $-(C=O)R^2$, $-(C=O)OR^3$, $-(C=O)OH$, $-CHO$, $-(C=O)NR^3R^3$, and $R^3$ is given above.

An imidization reaction combines the amine end-group with a cyclic anhydride to from an imide. The cyclic anhydride may have the formula:

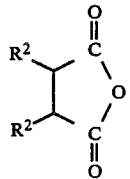

wherein $R^2$ is given above, but may also be hydrogen or join to form a cycloaliphatic. Such cyclic anhydrides will react with the amine end-group to from a succinimide. The cyclic anhydride may also have the formula:

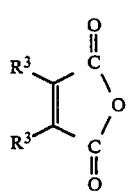

wherein $R^3$ is given above, but may also be hydrogen or join to form a cycloaliphatic. These cyclic anhydrides will react with the terminal amine end-group to form a maleimide. Still other examples of a cyclic anhydride have the general formula:

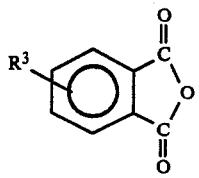

wherein $R^3$ is given above, but may also be hydrogen. These cyclic anhydrides will react with the amine end-group to form a phthalimide.

Specific and representative end-capping compounds include for the anhydrides, benzoic anhydride and acetic anhydride; for the acid chlorides, benzoyl chloride and acetyl chloride; for the carboxylic acids, benzoic acid and acetic acid; for the carboxylic acid esters, phenyl benzoate; for the amides, N,N-dimethyl acetamide; for the carbonates, diphenyl carbonate; for the isocyanates, phenyl isocyanate; and for the carbodiimides, diphenyl carbodiimide. Additional representative end-capping compounds include, for the aldehydes, benzaldehyde; for the acetals, dimethoxy methane; for the olefins, stilbene; for the saturated cyclic anhydrides, succinic anhydride; for the unsaturated cyclic anhydrides, maleic anhydride; and for the aromatic cyclic anhydrides, phthalic anhydride.

The above described reactions are commonly associated with amines and are ones which amines will readily undergo. Thus, the end-capping compounds mentioned in association with each reaction will generally react quite easily with the amine end-group and lower the amine end-group concentration of the polyamide.

The above list of reactions and compounds is not exhaustive. For example, the amine end-group may be reacted with epoxides to produce a more highly substituted and less reactive amine. Persons skilled in the art can easily imagine other amine end-capping reactions, the only objective being to lower the amine end-group concentration of the polyamide.

The amine end-capping reactions can be carried out simply, by melt extruding the polyamide with the end-capping compounds, even in the presence of a second or third thermoplasric polymer. The proper conditions for any given reaction, including temperature and proper amount of amine end-capping compound can easily be determined by persons skilled in the art. Obviously, the temperature must be high enough to melt the resin and encourage the reaction, but not so high as to degrade the polymer. In general, and particularly in the case of the cyclic anhydrides, it has been found that at least 1 equivalent and preferably 2 equivalents of end-capping compound to amine end-group functions should be added to reduce amine end-group concentration.

Inherent amine end-group concentration of a base polyamide may be controlled during polymerization by controlling the ratio of reactive amine or derivative thereof to reactive carboxylic acid or derivative thereof. For example, the amine end-group concentration of a polyamide may be lowered, by attaining higher molecular weights, by polymerizing a polyamide from an excess of diacid monomer over diamine monomer, by inserting in the polymerization a mono-amino or mono-carboxylic acid moiety to prevent or cap a terminal amino functionality, or by a combination of these methods. Of course, it is readily apparent that too high a ratio of diacid to diamine or too great a concentration of mono-amine or mono-carboxylic acid will drastically reduce molecular weight of the polyamide. Mono-amine compounds should be utilized in conjunction with an excess of dicarboxylic acid over diamine and mono-carboxylic acid compounds should be utilized with an excess or equal amounts of diamine over dicarboxylic acid or with a mono-amino/monocarboxylic acid compound or lactam. Those skilled in the art are capable of determining proper ratios of monomers to reduce amine end-group concentration while preserving molecular weight.

Representative mono-amino compounds include aliphatic mono-amines, cycloaliphatic mono-amines and aralkyl mono-amines. Depending upon the method of polymerization, such mono-amines must have appropriate molecular weights to prevent vaporization. Preferred mono-amines are dodecyl amine, decyl amine, tetradecyl amine, benzyl amine, and aminomethylene cyclohexane.

Representative mono-carboxylic acid compounds or derivatives thereof include aliphatic carboxylic acids, cycloaliphatic carboxylic acids, and aromatic carboxylic acids or the corresponding acid chloride or ester derivatives. The molecular weight of mono-carboxylic acids is controlled similarly to the mono-amines to prevent vaporization during polymerization. Preferred monocarboxylic acids or derivatives thereof include benzoic acid, benzoyl chloride, naphthaoic acid, stearic acid, stearoyl chloride, phenyl benzoate, phenyl naphthalate, and phenyl stearate.

An additional source of polyamides with low amine groups is obtained by a polymerization reaction which provides "amine free" polyamides. Reaction of diisocyanare and diacids in excess yields polyamide with acid end-groups according to the following reaction scheme:

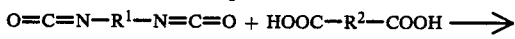
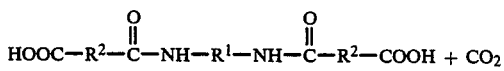

wherein $R^1$ is as defined above for the diamines and $R^2$ is as defined above for the dicarboxylic acids A commercially available "amine free" polyamide is Isonamid 7030 available from Dow Chemical. This polymer is obtained from diphenyl methane diisocyanate and aliphatic diacids. Common aliphatic diacids are adipic acid, $C_4$, and azelaic acid, $C_7$. Suitable processes are described in U.S. Pat. Nos. 4,087,481; 4,420,603; and 4,156,065; incorporated by reference herein.

It is also to be understood that these amorphous polyamides include the toughened or the super-tough polyamides. These polymers are available commercially from E. I. duPont under the tradename Zytel ST or may be prepared in accordance with U.S. Pat. Nos. 4,174,358, 4,474,927, or 4,346,194, incorporated herein by reference. The super-tough polyamides are prepared by blending the polyamide polymers with one or more polymeric elastomeric toughening agents. Suitable toughening agents are disclosed in the above patents as well as in Caywood Jr., U.S. Pat. No. 3,884,882 and Swiger U.S. Pat. No. 4,147,740, incorporated herein by reference. Typically, these elastomeric polymers and copolymers are straight chained or branched as well as graft copolymers and also include core-shell graft copolymers. They are characterized as having incorporated therein a monomer having functional and/or active polar groupings capable of interacting or adhering to the polyamide matrix so as to enhance the toughness of the polyamide polymer.

The above polyamides may be prepared by any of several well known processes. Salt polymerization reacts an amine group and a carboxylic acid group to form an amide group with the concomitant elimination of water. Oligomeric salts are formed, water is removed, and polymerization proceeds at higher temperatures. Other processes include solution or interfacial polymerization. These processes recommend reacting an amine with an acid chloride to form a polyamide with the loss of hydrochloric acid. A preferred process is melt polymerization, by amine-ester interchange. A solvent may be added, or the process may be performed without a solvent as described in U.S. Pat. No. 4,567,249, hereby incorporated by reference.

Polyamides for use herein may have a number average molecular weight ranging from about 12,000 to about 60,000 g/mole, preferably from about 15,000 to about 40,000 g/mole, and most preferably from about 20,000 to about 35,000 g/mole, as determined by membrane osmometry; J. Herold, G. Meyerhoff, Evr. Polym, J. 15,525 (1979). Alternately, preferred polyamides may be described as having an intrinsic viscosity ranging from about 0.5 to about 1.6 dl/g, preferably from about 0.7 to about 1.4 dl/g, and most preferably from about 0.9 to about 1.2 dl/g as measured with 40 mg per 10 cc of a 60/40 weight ratio phenol/tetrachloroethylene solvent at 30° C.

Blends of polycarbonate and polyamide resins are generally obtainable in all proportions relative to each other. Consequently, blends having a ratio of polyamide to polycarbonate in the range of 1:99 to 99:1 are within the scope of this invention. By controlling the proportions of the polyamide and polycarbonate relative to each other, blends having certain properties may be readily obtained. The impact modifiers of this invention are particularly effective wherein the ratio of polycarbonate to polyamide ranges from about 90:10 to 10:90 and are most effective at ratios of about 80:20 to 20:80. Where gas barrier properties are desired, preferred blends generally have from 20 to 80 weight percent amorphous polyamide. This range encompasses the ratios preferred for high impact strength, making these blends suitable for use in liquid packaging applications.

The impact modifiers employed in this invention are polyamide - polyether block copolymers which may be represented by the schematic formula:

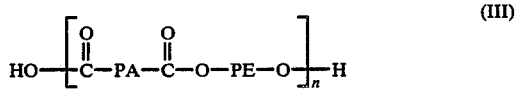

(III)

wherein PA represents the polyamide segment, PE represents a polyether segment and n is an integer such that the block copolymer has a weight average molecular weight ($m_w$) of from about 5,000 to about 100,000. Polyamide-polyether block copolymers of the class described above are generally well known and may be prepared for example by the condensation reaction of a prepolyamide and a polyoxyalkylene glycol, by conventional technique; see for example the preparative methods described in U.S. Pat. Nos. 4,208,493; 4,230,838; 4,361,680; and 4,331,786, all of which are incorporated herein by reference thereto. The polyamide-polyether block copolymers so prepared are commercially available and may be wide ranging in their make-up from a wide range of prepolyamides and polyoxyalkylene glycols.

The prepolyamide may have an inherent viscosity of at least about 0.1 (determined at a temperature of 25° C. using 0.25 gm of polymer per 100 ml. of a solvent consisting of 60 percent phenol and 40 percent by volume of tetrachloroethane) and will be terminated with acid or amine groups. The prepolyamide may be the polymerization product of a difunctional diamine component and a difunctional dicarboxylic acid.

In general, any aliphatic, alicyclic, and aromatic difunctional diamine or mixture of diamines can be used to prepare the prepolyamide. Examples of such diamines include polymethylenediamines of the formula $H_2N(CH_2)_xNH_2$, wherein x is a positive integer of from 2 to 12 (such as dimethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, and dodecamethylenediamine); 1,1-, 1,2-, 1,3-, and 1,4-cyclohexane-bis-(methylamines); o-, m-, and p-xylenediamines; 1,2-, 1,3- and 1,4-cyclohexanediamines; 3-methylhexamethylenediamine; 3-methylheptamethyenediamine; 2,4-dimethylhexamethylenediamine; 2,4-toluenediamine; p,p'-diphenyldiamine; 1,4-dimethyl-3,5-diaminobenezene; 2,5-norcamphane-bis-(methylamine); o-, m-, and p-phenylenediamines; 2,5-,2,6-, and 2,7-naphthalenediamines; benzidine; 4,4'-methylenedianiline; and 3,4'-diaminodiphenyl. The N,N'-diphenyldiamines of U.S. Pat. No. 3,297,656 can also be employed.

In general, any aliphatic, alicyclic, and aromatic difunctional dicarboxylic acid can be used to prepare the prepolyamide. Examples of such acids include oxalic; malonic; dimethylmalonic; succinic; glutaric; adipic; trimethyladipic; pimelic; 2,2-dimethylglutaric; azelaic; sebacic; suberic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; t-butyl isophthalic; 2,5-norbornanedicarboxylic; 1,4-naphthalenedicarboxylic; diphenic; 4,4'-oxydibenzoic; diglycolic; thiodipropionic; 2,2,4-trimethyladipic; 4,4'-sulfonyldibenzoic; 2,5-naphthalenedicarboxylic; 2,6-naphthalenedicarboxylic; and 2,7-naphthalenedicarboxylic acids.

The prepolyamides are prepared by conventional and known techniques for the preparation of a polyamide resin and may have a weight average molecular weight of from 300 to 15,000.

The polyoxyalkylene glycols used to prepare the polyamide-polyether block copolymers used as impact-modifiers in the present invention are well known compounds and include for example polyoxypropylene glycol, polyoxyethylene glycol and polyoxybutylene glycol, each of which are commercially available and have weight average molecular weights ($M_w$) of from 200 to 15,000. The preferred polyoxyalkylene glycols may also be characterized by an inherent viscosity of from 0.1 to 0.5 (determined as described above for the determination of inherent viscosity of the prepolyamide). The polyether can have diol and/or diamine end groups, amino end groups can be prepared through cyanoethylation of the polyether followed by hydrogenation. Other modifications of the polyether end groups can also be made to facilitate bonding to the polyamide blocks.

The preferred impact-modifying polyamide-polyether block copolymer employed in the compositions and the method of the invention are of the formula (III) given above, wherein PA represents a saturated amide sequence formed from a lactam or an amino acid having a hydrocarbon chain containing from 4 to 14 carbon atoms, inclusive, or from a diamine and a dicarboxylic acid each having from 4 to 40 carbon atoms, inclusive; said amide having a weight average molecular weight of from 300 to 15,000; and PE represents a polyether sequence formed from a polyoxyalkylene glycol having a weight of from 200 to 15,000. Most preferred, the copolymer will be one wherein the proportion by weight of polyoxyalkylene glycol with respect to the total weight of the copolymer is form 5 to 85 percent. In general, these preferred block copolymers will have an intrinsic viscosity of from 0.8 to 2.05 as measured in meta-cresol at 25° C. (initial concentration: 0.8 gms/100 ml).

The impact-modifying copolymer can be present in a wide range of concentrations. However, to obtain the most useful blends, it is preferable to maintain the concentration of impact-modifying copolymer to less than 40% by weight of the total composition of the invention. Concentrations of from 5 to 30 weight percent ot impact-modifying copolymer provide a significant enhancement in impact strength without a significant loss to other desirable physical properties of the blend, such as heat distortion temperature. Concentrations below 5% by weight can be expected to have an enhancing effect on impact strength but at levels which correspond to the low concentration. The most preferred concentrations fall within the highest impact modifying effect varying with the ratio of polycarbonate to polyamide, as discussed above.

The compositions of the invention may contain other components such as stabilizers, flame retardants, mold release agents, foaming agents, pigments, and other thermoplastic resins such as polyesters, polyphenylene ethers, polyimides and the like.

The compositions ot the invention may also contain fillers and reinforcing fibers such as, for example, glass and carbon. The fillers may include, for example, silica, talc, clay, mica, calcium sultate and calcium carbonate. The amount of such additives present is dependent upon the desired effect and it is within the knowledge of those skilled in the art to determine the appropriate amounts.

Preparation of the blends of this invention may be accomplished by any conventional blending technique such as, for example, dry blending, melt blending, solution blending and the like. Melt blending may be accomplished in a conventional extruder, from which the admixture may be molded into a part of specific dimensions or further extruded to a film or sheet product.

The following examples describe the manner and process of making and using the invention and set forth the best mode contemplated by the inventors of carrying out the invention but are not to be construed as limiting. Where reported, the test results provided were determined by the following test procedures:

Elongation (%):
According to the ASTM test method D-638.
Notched Izod Impact Strength (NI):
According to ASTM test method D-256.
Heat Deflection Temperature (HDT):
According to ASTM test method D-648.

EXAMPLES 1-9 AND CONTROL

A series of polycarbonate/amorphous nylon blends were prepared in the absence and presence of impact modifier. All blends were compounded on a Werner Pfleiderer ZSK 30 mm twin screw extruder at temperatures of from 260°–280° C. The resulting pellets, which comprised blends of this invention or the "control" blend, were dried for six hours at 110° C. before injection molding into ASTM test specimens on a 75 ton, 3 oz. injection molding machine. Mechanical properties were measured according to standard test procedures. The compositional make-up of each blend and the test results are set forth in the Table I, below.

TABLE I

| Composition* | Control | \multicolumn{9}{c}{EXAMPLE} |
|---|---|---|---|---|---|---|---|---|---|---|
| | | 1 | 2 | 3 | 4 | 5 | 6 | 7 | 8 | 9 |
| | | | | | Parts by Weight | | | | | |
| PC | 50 | 50 | 50 | 50 | 50 | 50 | 50 | 70 | 50 | 30 |
| PA6, I, T | 50 | 30 | 40 | 45 | 50 | 30 | 40 | 20 | 40 | 60 |
| PA-PE Copolymer B | — | 20 | 10 | 5 | 1 | — | — | 10 | 10 | 10 |
| PA-PE Copolymer A | — | — | — | — | — | 20 | 10 | | | |
| | | | | | Test Properties | | | | | |
| N. Izod (J/M) | 74.7 | 1068.0 | 950.7 | 112.0 | 90.8 | 1335.2 | 1388.6 | 1025.5 | 950.7 | 165.6 |
| Elong. % | 22 | 79 | 34 | 13 | 9 | 38 | 22 | 25 | 34 | 13 |
| HDT @ 1.83 MPa (°C.) | 269 | 234 | 237 | 237 | 245 | 238 | 246 | 245 | 237 | 224 |

*PC = 130 grade Lexan ® polycarbonate from General Electric Co.
PA6, I, T = Zytel ® 330 from duPont De Nemours and Co.; polyhexamethylene co iso-terephthalamide (amorphous polymide).
PA-PE copolymer A = PEBAX ® 4033 from ATOChem, Paris, France.
PA-PE copolymer B = PEBAX ® 2533 from ATOChem, Paris, France.

It will be seen from the examples that the addition of the polyamide-polyether copolymer impact modifiers are effective in improving impact at a concentration of 5%. However, even 1% gives a slight improvement in notched Izod over the unmodified control. Elongation is also improved and it is suggested that the polyamide-polyether block copolymer additive may also act as a compatibilizer, improving adhesion between the polycarbonate and the amorphous polyamide phases of the blended composition.

What is claimed is:
1. A thermoplastic blend comprising:
   (a) an aromaric polycarbonate resin;
   (b) an amorphous polyamide resin; and
   (c) an impact-modifying proportion of a polyamide-polyether block copolymer.

2. A thermoplastic blend as in claim 1 wherein the polycarbonate resin contains structural units of the formula:

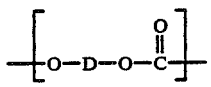

wherein D is divalent aromatic radical.

3. A thermoplastic blend as in claim 2 wherein aromatic polycarbonate resin comprises polymers selected from the group consisting of poly(ester-carbonate)-polymers.

4. A thermoplastic blend as in claim 2 wherein the aromatic polycarbonate is obtained by polymerizing phosgene with 2,2-bis(4-hydroxyphenyl) propane.

5. A thermoplastic blend as in claim 4 wherein the aromatic polycarbonate is obtained by polymerizing phosgene with 2,2-bis(4-hydroxyphenol) propane and a mixture of isophthalic and terephthalic acids.

6. A thermoplastic blend as in claim 1 wherein said amorphous polyamide is substantially free of amine end-groups.

7. A thermoplastic blend as in claim 1 wherein the ratio of amorphous polyamide to polycarbonate falls within the range of 10:90 to 90:10.

8. A thermoplastic blend as in claim 1 wherein the amorphous polyamide contains structural units selected from those of the formula:

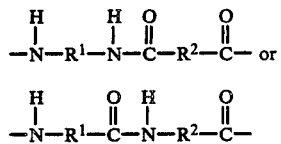

wherein $R^1$ and $R^2$ are different divalent organic radicals selected from the group consisting of $C_2-C_{15}$ alkylene radicals $C_3-C_{18}$ cycloalkylene radicals and $C_6$ to $C_{20}$ arylene radicals.

9. A thermoplastic blend as in claim 8 wherein the amorphous polyamide is obtained by polymerization of members selected from the group consisting of
   (a) terephthalic acid with, trimethylhexamethylene diamine;
   (b) isophthalic acid with trimethylhexamethylene diamine;
   (c) adipic acid, azelaic acid and 2,2-bis-(p-aminocyclohexyl) propane;
   (d) terephthalic acid with bis (4-amino cyclohexyl) methane;
   (e) isophthalic acid with hexamethylenediamine;
   (f) terephthalic acid/isophthalic acid with hexamethylene diamine, and
   (g) adipic acid/azelaic acid with diphenyl methane diisocyanate.

10. A thermoplastic blend as in claim 1 wherein the polyamide-polyether block copolymer possesses recurring chain units of the formula:

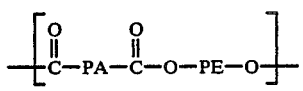

wherein PA represents a saturated amide sequence formed from a lactam or an amino acid having a hydrocarbon chain containing from 4 to 14 carbon atoms, inclusive, or from a dicarboxylic acid and a diamine wherein both can have from 4 to 40 carbon atoms, inclusive; and PE represents a polyether sequence formed from a polyoxyalkylene glycol.

11. The blend of claim 10 wherein the proportion by weight of the polyoxyalkylene glycol sequence to the total weigh of the block copolymer is from 5 to 85 percent.

12. A thermoplastic blend as in claim 1 wherein the impact-modifying proportion is from 5 to 30 weight percent of the blend.

13. An article molded from the composition of claim 1.

* * * * *